United States Patent
Zhao

(10) Patent No.: US 12,432,212 B2
(45) Date of Patent: Sep. 30, 2025

(54) DATA SHARING METHOD, APPARATUS AND SYSTEM, AND SERVER AND COMPUTER STORAGE MEDIUM

(71) Applicants: BEIJING BOE TECHNOLOGY DEVELOPMENT CO., LTD., Beijing (CN); BOE TECHNOLOGY GROUP CO., LTD., Beijing (CN)

(72) Inventor: Junjie Zhao, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 76 days.

(21) Appl. No.: 18/272,876

(22) PCT Filed: Jan. 19, 2022

(86) PCT No.: PCT/CN2022/072684
§ 371 (c)(1),
(2) Date: Jul. 18, 2023

(87) PCT Pub. No.: WO2022/156694
PCT Pub. Date: Jul. 28, 2022

(65) Prior Publication Data
US 2024/0305641 A1 Sep. 12, 2024

(30) Foreign Application Priority Data
Jan. 22, 2021 (CN) .......................... 202110088792.2

(51) Int. Cl.
*H04L 9/40* (2022.01)

(52) U.S. Cl.
CPC ............ *H04L 63/101* (2013.01); *H04L 63/20* (2013.01)

(58) Field of Classification Search
CPC ......... H04L 63/101; H04L 63/20; H04L 9/40; H04L 63/10; H04L 67/1095; H04L 2209/60; H04L 12/14; H04L 12/1403
See application file for complete search history.

(56) References Cited

U.S. PATENT DOCUMENTS

| | | | |
|---|---|---|---|
| 8,931,034 B2* | 1/2015 | van Slingerland | H04L 51/52 726/4 |
| 11,025,595 B2* | 6/2021 | Kandregula | H04L 63/0823 |

(Continued)

FOREIGN PATENT DOCUMENTS

| | | |
|---|---|---|
| CN | 102959922 A | 3/2013 |
| CN | 108141446 A | 6/2018 |

(Continued)

*Primary Examiner* — Alex Tran
(74) *Attorney, Agent, or Firm* — CHIWIN LAW LLC

(57) ABSTRACT

Provided are a data sharing method, apparatus and system, and a server and a computer storage medium. The data sharing method includes: receiving a data acquisition request from a first entity, wherein the data acquisition request includes an identifier of a resource of a second entity for storing target data, and sharing operation indication information; on the basis of the data acquisition request, setting respective resource access control policies for the first entity and the second entity, such that the first entity and the second entity can access each other's resources to realize data sharing; and sending a data acquisition response to the first entity, wherein the data acquisition response includes the target data.

18 Claims, 9 Drawing Sheets

(56) References Cited

U.S. PATENT DOCUMENTS

| | | | |
|---|---|---|---|
| 11,030,343 B1* | 6/2021 | Chu | H04L 63/104 |
| 11,271,742 B2* | 3/2022 | Soroker | H04L 9/3239 |
| 11,546,341 B2* | 1/2023 | Fuhry | G06F 21/602 |
| 11,740,942 B2* | 8/2023 | Kumar | G06F 9/5044 |
| | | | 718/104 |
| 11,831,646 B2* | 11/2023 | Achyuth | H04L 63/0861 |
| 12,126,999 B2* | 10/2024 | Flynn, IV | H04W 12/37 |
| 2011/0321132 A1 | 12/2011 | Slingerland et al. | |
| 2017/0063931 A1* | 3/2017 | Seed | G06Q 20/4016 |
| 2021/0216656 A1* | 7/2021 | Xuan | G06F 16/258 |
| 2021/0351938 A1* | 11/2021 | Fan | H04L 63/0823 |

FOREIGN PATENT DOCUMENTS

| | | |
|---|---|---|
| CN | 110691061 A | 1/2020 |
| CN | 111490966 A | 8/2020 |
| WO | 2019067817 A1 | 4/2019 |

\* cited by examiner

Internet of Things system 800

900

DATA SHARING METHOD, APPARATUS AND SYSTEM, AND SERVER AND COMPUTER STORAGE MEDIUM

CROSS-REFERENCE TO RELATED APPLICATIONS

The present patent application claims priority of Chinese Patent Application No. 202110088792.2 filed on Jan. 22, 2021, the disclosure of which is incorporated herein by reference in its entirety as part of the present application.

TECHNICAL FIELD

The present disclosure relates to a field of data processing, and more particularly, to a data sharing method, an apparatus, a system, a server and a computer storage medium.

BACKGROUND

With development of the Internet of Things and digital twin technologies, a large number of manufacturers provide the business model of "device+service", that is, device A generates a large amount of data and sends the same to platform A for use of application A, device B generates a large amount of data and sends the same to platform B for use of application B, and device C generates a large amount of data and sends the same to platform C for use of application C. The business model is applicable to enterprises having a platform self-building capability. Such scenario is as shown in FIG. 1A.

Enterprises lacking the self-building capability usually connect devices to a common service platform of a third party, and respective applications supply services for users through accessing the common service platform. Data generated by devices of respective enterprises is sent to the common service platform, and applications of the respective enterprises access data of a corresponding device through the common service platform. Such scenario is as shown in FIG. 1B.

However, there is a case where one application (application A) expects to access data of another application (application B), or one application (application A) expects to access device data uploaded to the platform by a device (device B) associated with another application (application B). Taking Custom to Manufacture (C2M) in intelligent manufacture as an example, a user's demand may be sent to respective manufacturers via an application and then through the common service platform for production. For example, via application A and through the common service platform, a product idea A of the user may be sent to manufacturer A, and another product idea B may be sent to manufacturer B. With development of C2M, more and more ordinary users will become initiators of orders; due to limited design knowledge of ordinary users, it is very likely that different products fail to have a uniform style, for example, an idea about tables and chairs will be notified to manufacturer A via application A and through the common service platform, an idea about the furniture will be notified to manufacturer B via application B and through the common service platform; and if styles thereof are not uniform, products manufactured by manufacturer A and manufacturer B will cause disharmony in family environment.

SUMMARY

To solve the above-described problems, embodiments of the present disclosure provide a data sharing method, an apparatus, a system, a server and a computer storage medium. The data sharing may be data sharing between application entities, or may also be data sharing between other entities (e.g., common service entities), or may also be data sharing between application entities and other entities.

According to an aspect of present disclosure, a data sharing method is provided, which comprises: receiving a data acquisition request from a first entity, wherein, the data acquisition request includes an identity of a resource of a second entity storing target data, and sharing operation indication information; setting resource access control policies of the first entity and the second entity based on the data acquisition request, so that the first entity and the second entity are capable of accessing each other's resource to implement data sharing; and sending a data acquisition response to the first entity, wherein, the data acquisition response includes the target data.

According to the embodiments of present disclosure, the sharing operation indication information comprises: the identity of the resource of the first entity; or, an identity of a sharing operation; or the identity of the sharing operation and the identity of the resource of the first entity, wherein, setting resource access control policies of the first entity and the second entity based on the data acquisition request, comprises: determining that the first entity expects to share data with the second entity, based on the identity of the resource of the first entity and/or an identity of a sharing operation and the identity of the resource of the second entity; and determining whether the first entity meets the resource access control policy of the second entity, and setting resource access control policies of the first entity and the second entity based on the determination.

According to the embodiments of present disclosure, the sharing operation indication information only comprises: an identity of a sharing operation; or the identity of the sharing operation and the identity of the resource of the first entity, wherein, setting resource access control policies of the first entity and the second entity based on the data acquisition request, comprises: determining that the first entity expects to share data with the second entity at least based on the identity of the sharing operation, and setting the resource access control policies of the first entity and the second entity.

According to the embodiments of present disclosure, the setting the respective resource access control policies of the first entity and the second entity, comprises: updating the resource access control policy of the first entity, and updating the resource access control policy of the second entity; or creating a temporary access control policy of the first entity, and creating a temporary access control policy of the second entity; or updating the resource access control policy of the first entity, and creating a resource temporary access control policy of the second entity; or updating the resource access control policy of the second entity, and creating a temporary access control policy of the first entity.

According to the embodiments of present disclosure, updating the resource access control policy of the first entity comprises: causing an accessing party identity in the resource access control policy of the first entity to include the identities of the first entity and the second entity, the accessing party identity indicating an identity of an entity that is allowed to access the resource of the first entity; and updating the resource access control policy of the second entity comprises: causing an accessing party identity in the resource access control policy of the second entity to include the identities of the first entity and the second entity, the accessing party identity indicating an identity of an entity that is allowed to access the resource of the second entity.

According to the embodiments of present disclosure, creating the temporary access control policy of the first entity comprises: creating a temporary accessing party identity, and including the identity of the second entity therein, the temporary accessing party identity indicating an identity of an entity that is allowed to temporarily access the resource of the first entity; creating the temporary access control policy of the second entity comprises: creating a temporary accessing party identity, and including the identity of the first entity therein, the temporary accessing party identity indicating an identity of an entity that is allowed to temporarily access the resource of the second entity.

According to the embodiments of present disclosure, updating the resource access control policy of the first entity or the second entity further comprises: adding a data amount limit, indicating an upper limit threshold of a data amount allowed to be acquired from the resource of the first entity or the resource of the second entity; or creating the resource access control policy of the first entity or the second entity further comprises: creating a data amount limit, indicating an upper limit threshold of a data amount allowed to be acquired from the resource of the first entity or the resource of the second entity through temporary access; when the data amount acquired through temporary access from the resource of the first entity or the resource of the second entity reaches the upper limit threshold of the data amount, it is prohibited to continue to acquire data from the resource of the first entity or the resource of the second entity.

According to the embodiments of present disclosure, creating the temporary access control policy of the first entity or the second entity further comprises: creating a temporary access time limit, indicating time allowed for temporary access to the resource of the first entity or the resource of the second entity.

According to the embodiments of present disclosure, the method further comprises: determining whether the resource of the first entity have a same data type as the resource of the second entity; in a case where it is determined that the resource of the first entity have a same data type as the resource of the second entity, updating the resource access control policy or creating the resource access control policy of the first entity or the second entity further comprises: adding a data sharing rule, to limit that upper limit thresholds of data amounts for data of the same data type respectively acquired by the first entity and the second entity from each other should be equal.

According to the embodiments of present disclosure, the method further comprises: determining whether the resource of the first entity have a same data type as the resource of the second entity; in a case where it is determined that the resource of the first entity have a different data type from the resource of the second entity, updating the resource access control policy or creating the temporary access control policy of the first entity or the second entity further comprises: adding a data sharing rule, to limit that upper limit thresholds of data amounts for data of different data types respectively acquired by the first entity and the second entity from each other should be equal; and adding a data amount conversion rule, for converting the data amounts acquired from the resource.

According to the embodiments of present disclosure, wherein, data under a resource of each entity has a content value attribute, and a value of the content value attribute is predefined and positively related to usefulness of the data under the resource of the entity relative to the entity; the data amount conversion rule comprises: multiplying a data amount of data acquired from a resource by a value of the content value attribute of the data to obtain a converted data amount, and prohibiting to continue to acquire data from the resource, in a case where the converted data amount exceeds an upper limit threshold of the data amount.

According to the embodiments of present disclosure, the first entity is associated with a first common service entity; the second entity is associated with a second common service entity, and the first common service entity and the second common service entity are registered to each other, wherein, receiving the data acquisition request from the first entity, comprises: receiving, by the first common service entity, the data acquisition request from the first entity; and forwarding the data acquisition request to the second common service entity, in a case where the first common service entity determines that the second entity is not associated with the first common service entity but is associated with the second common service entity based on the identity of the resource of the second entity included in the data acquisition request.

According to the embodiments of present disclosure, setting resource access control policies of the first entity and the second entity based on the data acquisition request, comprises: setting, by the second common service entity, the resource access control policy of the second entity based on the data acquisition request, so that the first entity is capable of accessing the resource of the second entity; returning, by the second common service entity, a data acquisition response to the first common service entity, the data acquisition response including data of the target resource; setting, by the first common service entity, the resource access control policy of the first entity based on the data acquisition response, so that the second entity is capable of accessing the resource of the first entity; and returning, by the first common service entity, the data acquisition response to the first entity.

According to another aspect of present disclosure, a data sharing apparatus is provided which comprises: a receiving module, configured to receive a data acquisition request from a first entity, wherein, the data acquisition request includes an identity of a resource of a second entity storing target data, and sharing operation indication information; a setting module, configured to set respective resource access control policies of the first entity and the second entity based on the data acquisition request, so that the first entity and the second entity are capable of accessing each other's resource to implement data sharing; and a sending module, configured to send a data acquisition response to the first entity, wherein, the data acquisition response includes the target data.

According to the embodiments of present disclosure, the apparatus further comprises: a determining module, configured to determine whether the resource of the first entity have a same data type as the resource of the second entity, and sends a determination result to the setting module, so that the setting module sets the resource access control policies of the first entity and the second entity according to the determination result.

According to yet another aspect of present disclosure, a data sharing system is provided, which comprises: a first manufacturing device and a second manufacturing device; a first manufacture application entity and a second manufacture application entity, wherein, the first manufacture application entity is associated with the first manufacturing device, and the second manufacture application entity is associated with the second manufacturing device; and an Internet of Things platform, configured to: store data uploaded by the first manufacturing device under a resource of the first manufacture application, the data, together with application data of the first manufacture application being taken as product data of the first manufacture application entity; store data uploaded by the second manufacturing device under a resource of the second manufacture application, the data, together with application data of the second manufacture application being taken as product data of the second manufacture application entity; receive a data acquisition request sent by the first manufacture application, the data acquisition request including an identity of the resource of the second manufacture application storing target product data and product data sharing operation indication information; set resource access control policies of the first manufacture application and the second manufacture application based on the data acquisition request, so that the first manufacture application and the second manufacture application are capable of accessing each other's resource to acquire each other's product data; and send a data acquisition response to the first manufacture application entity, the data acquisition response including the target product data.

According to the embodiments of present disclosure, the first manufacture application is configured to: adjust the product data of the first manufacture application according to the product data of the first manufacture application and the target product data acquired from the resource of the second manufacture application, so that the product data of the first manufacture application is compatible with the product data of the second manufacture application.

According to yet another aspect of present disclosure, a server is provided, which comprises: a processor; and a memory, having a program stored thereon, wherein, the program, when executed by the processor, causes the processor to execute the respective steps of the data sharing method as mentioned above.

According to yet another aspect of present disclosure, a computer storage medium is provided, which has a program stored thereon, wherein, the computer program, when executed by the processor, implements the data sharing method as mentioned above.

BRIEF DESCRIPTION OF THE DRAWINGS

In order to explain the principle of the present disclosure, embodiments of the present disclosure will be described in conjunction with the accompanying drawings. It should be understood that the elements shown in the diagrams may be implemented as various forms of hardware, software, or combinations thereof. Optionally, these elements are implemented in a combination of hardware and software on one or more appropriately programmed general-purpose computer devices.

DETAILED DESCRIPTION

Figure 1A:
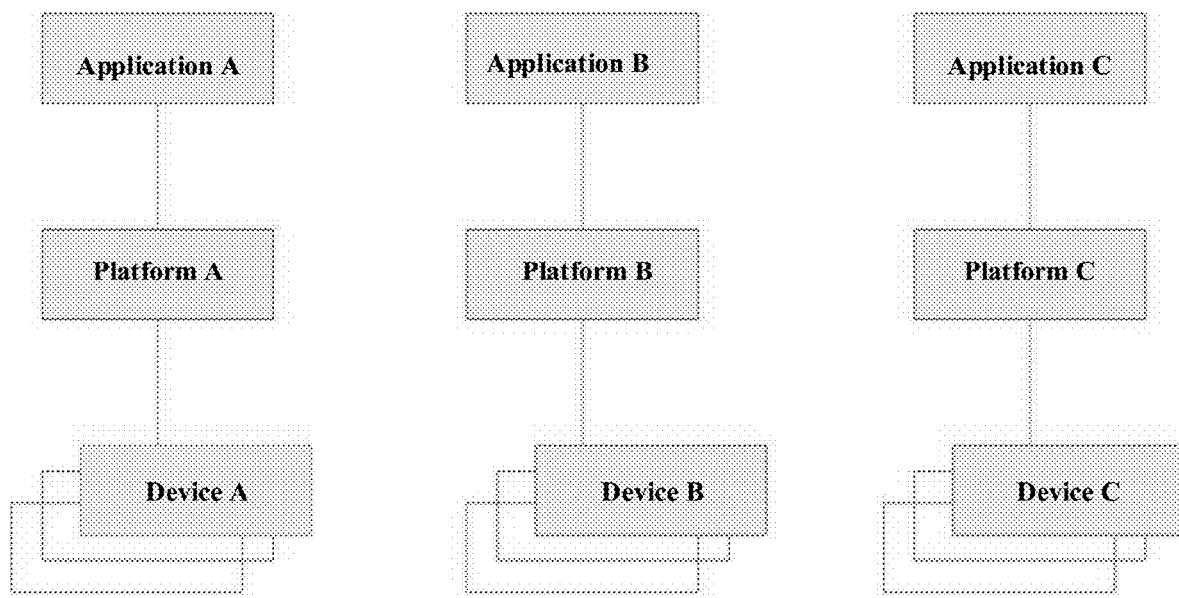
FIG. 1A shows a schematic diagram of a scenario where different platforms serve different specific applications and devices.
Figure 1B:
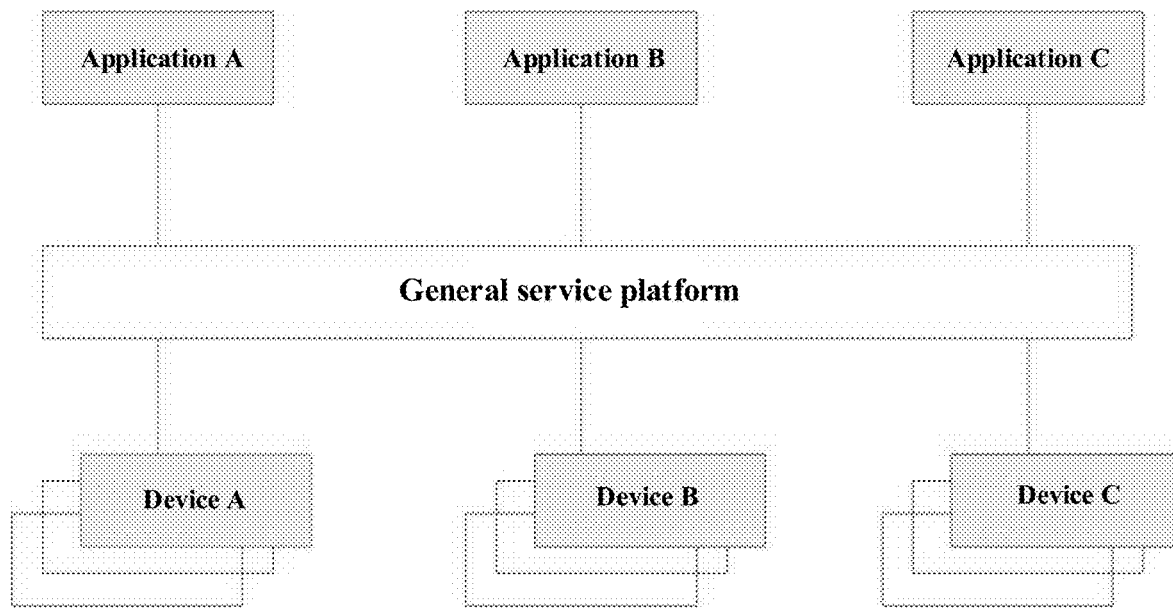
FIG. 1B shows a schematic diagram of a scenario where a common service platform serves different applications and devices.

Hereinafter, the embodiments of the present disclosure will be described more sufficiently with reference to the accompanying drawings, in which the embodiments of the present disclosure are shown. However, the present disclosure may be implemented in many different forms, and should not be construed as limited to the embodiments set forth herein. In the full text, similar reference signs are used to represent similar elements.

The terms used herein are only for the purpose of describing specific embodiments and are not intended to limit the present disclosure. As used herein, singular forms of "a" and "the" are intended to include plural forms as well, unless the context clearly indicates otherwise. It should also be understood that, when used herein, the term "including" designates occurrence of declared features, entirety, steps, operations, elements and/or components, but does not preclude occurrence or addition of one or more other features, entirety, steps, operations, elements, components and/or groups thereof.

Unless otherwise defined, the terms used herein (including technical terms and scientific terms) have same meaning as those commonly understood by those ordinarily skilled in the art to which the present disclosure belongs. The terms used herein shall be interpreted as having a meaning consistent with a meaning thereof in the context of the specification and relevant fields, and shall not be interpreted in an idealized or overly formal sense, unless so defined herein.

When an entity of the Internet of Things (e.g., a software module in a terminal device or a node device of the Internet of Things) transmits data or information to a common service entity, the data or information may be stored as a separate resource. In addition, the entity of the Internet of Things may send a request to a common service entity to update the resource stored on the common service entity that corresponds to the entity of the Internet of Things, so as to reflect a state of the device run by the entity of the Internet of Things. Such update may be real-time or periodic, or may also be triggered by a certain condition. It should be noted that the resource referred to herein includes resources of various entities (e.g., which may be embodied as software modules in devices of the Internet of Things, such as Application Entity (AE), Common Service Entity (CSE) and other entities). The entity may represent a software module of a communication device, while the common service entity may represent a software module of a service platform, and the service platform may be local or remote.

In the Internet of Things, attribute-based access control is usually used for the access control for a resource, and through setting respective attributes in a resource access control policy (access control policy), the access to a corresponding resource is implemented. For example, the common service entity creates a resource for an entity, and creates a resource access control policy for the entity.

What is stored in the resource access control policy is the content of the access control policy (access control policy), that is, the content of evaluation basis (an access rule) for evaluating whether a request for accessing a target resource may be authorized. The request for accessing the target resource must pass corresponding authorization verification in the access control policy to complete an authorization operation for the request. For example, current resource access control policy may include: access control limit (accessControlLimit) for limiting the number of times a resource may be accessed; and access control location region or access control IP address (accessControlLocationRegion or accessControlIPAddress) for respectively limiting regions which an access requesting party sending an access request must be located in or IP addresses (blocks) which an access requesting party sending an access request must have. In addition, the resource access control policy may include a preset identity of an entity that is allowed to initiate an access to the resource. At present, an entity is only supported to access a resource associated therewith (e.g., application A may only access data of application A in the common service platform and data of device A associated therewith). Therefore, the above-described preset identity in the resource access control policy for the resource of the entity only includes an identity of the entity, and only when the identity of the requesting party initiating the access request is identical to the preset identity, the access request is authorized (access is allowed).

In current resource access control policy configuration scheme in the Internet of Things, one entity (e.g., the application entity as described above) may only acquire data associated therewith from the common service entity. For example, it may be understood that an application entity is mapped to a common service entity, the common service entity creates a resource for the application entity and stores application data of the application entity under the resource; in addition, a terminal (device) associated with the application entity is also mapped to the common service entity, the common service entity creates a resource for the terminal and stores data uploaded by the terminal under the resource; and through coordination of the common service entity, the application entity may acquire its own application data and the data of the associated terminal stored under the common service entity. Therefore, in the present disclosure, in order to facilitate understanding, the data under the resource for the application entity may be understood as the data of the application entity per se and the data uploaded by the associated device (terminal).

In the present disclosure, the described entities, for example, application entity AE, common service entity CSE, and data, etc., may all be represented by resources. A resource may have a unique identity, which includes an attribute and a sub-resource; wherein, the attribute is used to store information related to the resource, the sub-resource is a next-level resource of the resource, and the resource includes an index pointing to the sub-resource.

As described above, in a manufacture scenario, application B may expect to acquire application data of application A or device data uploaded by device A corresponding to application A, to adjust its own application data. For example, after receiving a user's idea, application B may expect to acquire application data of application A and/or device data uploaded by the corresponding device A, so that application B may adjust its own application data by comprehensively considering its own application data, the application data of application A and/or the device data uploaded by device A, so as to be compatible with product data of application A and/or device data of device A, so that a style of a product produced by device B and a style of a product produced device A are uniform.

Therefore, in order to solve the above-described problems, the present disclosure proposes a data sharing method, a system and a computer storage medium, to implement data sharing between different entities. The data sharing may be data sharing between application entities, or may also be data sharing between other entities (e.g., common service entities), or may also be data sharing between application entities and other entities.

It should be noted that in some description of the present disclosure, although various aspects of the data sharing method are described by taking an intelligent manufacture scenario as an example, those skilled in the art should understand that the data sharing method may be used in other application scenarios of the Internet of Things. For example, comprehensive application A (including bicycle sharing service and commercial recommendation service) is associated with bicycles of type A via a service platform, that is, application A may use data (e.g., temperature, speed, location data, etc.) uploaded by bicycles of type A, and application B is associated with bicycles of type B also via the same service platform, that is, application B may use data uploaded by bicycles of type B. When a user uses application B to ride a bicycle of type B, the bicycle of type B may upload data to the service platform in real time for use by application B. Meanwhile, comprehensive application A may supply commercial recommendation service, but because the bicycle of type A corresponding to comprehensive application A is not being used, current riding related information cannot be acquired in real time, so, comprehensive application A also expects to acquire the data uploaded by the type B bicycle for implementing relevant recommendation service. Therefore, in such a case, application A may also expect to share data with application B.

Hereinafter, various aspects of the data sharing method according to the embodiment of the present disclosure will be described with reference to FIG. 2A to FIG. 9.

Figure 2A:
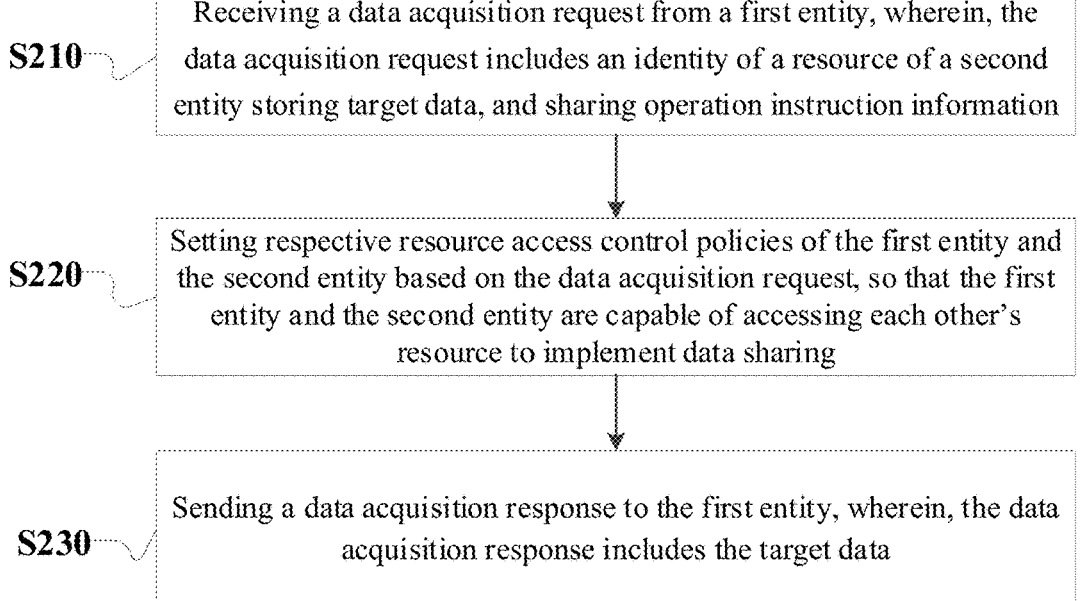
FIG. 2A to FIG. 2B show a schematic flow chart of a data sharing method according to an embodiment of the present disclosure.
Figure 2B:
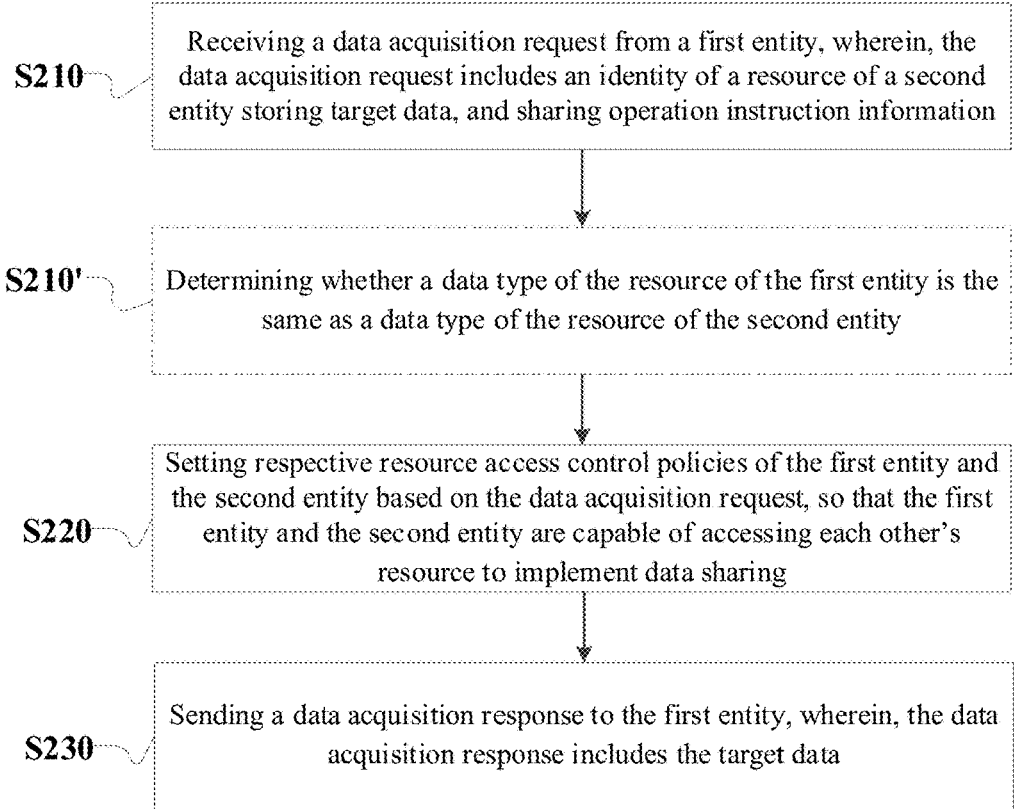

FIG. 2A to FIG. 2B show a schematic flow chart of a data sharing method according to an embodiment of the present disclosure. The method may be executed by a common service entity (may also be referred to as a general service platform).

As shown in FIG. 2A, in step S210, a data acquisition request is received from a first entity, wherein, the data acquisition request includes an identity of a resource of a second entity storing target data, and sharing operation indication information.

In this embodiment, the first entity may be a first application entity, and the second entity may be a second application entity. Or, the first entity may be a first common service entity, and the second entity may be a second common service entity. In such case, the common service entity for overall planning and coordination of respective entities may be referred to as a Hosting Common Service Entity (Hosting CSE). Both the first entity and the second entity are registered on the common service entity.

For example, the first entity may expect to acquire a portion of data (target data) under the resource of the second entity, so the identity of the resource of the second entity storing the target data is included in the data acquisition request and sent to the common service entity.

Optionally, before the step, the first entity may firstly determine whether it meets a resource access control policy of the second entity. For example, if the first entity has previously shared data with the second entity, and the previous resource access control policies of the first entity and the second entity are still valid (e.g., no invalidity notification has been received from the common service entity), the first entity may directly send the data acquisition request to the common service entity without including the sharing operation indication information; otherwise, the first entity needs to resend the data acquisition request including the sharing operation indication information.

In addition, according to the current resource access control policy, if there is no previous data sharing operation, the first entity is incapable of directly acquiring data from the resource of the second entity (the data of the resource of the second entity may only be subjected to an access request initiated by the second entity and may only be acquired by the second entity), that is, the first entity cannot meet the resource access control policy of the second entity, so the data sharing operation between the first entity and the second entity must be triggered. Therefore, the data acquisition request may further include the sharing operation indication information for triggering the data sharing operation, so that the first entity may acquire the data under the resource of the second entity.

Optionally, the sharing operation indication information may be implicit or explicit. For example, the sharing operation indication information may include an identity of a resource of the first entity, that is, the data acquisition request includes the identity of the resource of the second entity (target resource) and the identity of the resource of the first entity (source resource), to implicitly indicates the common service entity that the first entity expects to share data with the second entity. Or, the sharing operation indication information may include an identity of a sharing operation; or may include the identity of the sharing operation and the identity of the resource of the first entity. If the sharing operation indication information includes the identity of the sharing operation, the common service entity is explicitly indicated that the first entity sending a request including the identity of the sharing operation expects to share data with the second entity (the data acquisition request includes the identity of the second entity).

In addition, even if the sharing operation indication information does not include the identity of the resource of the first entity, that is, only includes the identity of the sharing operation, the common service entity may also know who sent the request thereto, and therefore may also know that the first entity indicates the common service entity that the data under the resource thereof may be available for sharing with the second entity.

By including the sharing operation indication information in the data acquisition request, the first entity will receive a data acquisition failure response when the first entity does not have access control authority of the resource of the second entity, and the first entity may finally acquire the access control authority of the resource of the second entity through the data acquisition request alone (which is set by the common service entity in subsequent steps described later), which simplifies an operation flow of the first entity, and reduces workload of the first entity.

In step S220, resource access control policies of the first entity and the second entity are set based on the data acquisition request, so that the first entity and the second entity are capable of accessing each other's resource to implement data sharing.

Optionally, when the sharing operation indication information only includes the identity of the resource of the first entity, step S220 may include: determining that the first entity expects to share data with the second entity, and that the first entity does not meet the resource access control policy of the second entity, based on the identity of the resource of the first entity and the identity of the resource of the second entity; and setting resource access control policies of the first entity and the second entity based on the determination.

For example, as described above, if data sharing has not been performed previously between the first entity and the second entity, the identity of application A (the first entity) must not be included in the preset identity of the access requesting party that is allowed to access to the resource of application B, so application A does not meet the resource access control policy of application B, and the data acquisition request (access request) sent by the application A cannot be allowed according to the current resource access control policy. Therefore, the common service entity sets (modifies, updates, creates, etc.) the resource access control policies of application A and application B, so that application A and application B are capable of accessing each other to implement data sharing. Optionally, a data acquisition failure response may be firstly returned to the first entity.

Optionally, with respect to a case where the sharing operation indication information includes the identity of the sharing operation or includes the identity of the sharing operation and the identity of the first entity, step S220 may include: determining that the first entity expects to share data with the second entity at least based on the identity of the sharing operation, and setting the resource access control policies of the first entity and the second entity.

That is to say, as long as the identity of the sharing operation is received, the resource access control policies of the first entity and the second entity may be directly set without additionally judging whether the resource (entity) sending out the data acquisition request meets the resource access control policy of the target resource. Of course, the judgment step may also be executed.

Optionally, the common service entity may determine whether the first entity sending the data acquisition request and the second entity as the target are trusted parties, before setting the resource access control policies of the first entity and the second entity, so as to improve security. For example, trusted levels of the first entity and the second entity may be determined through historical interaction records of the first entity and the second entity with the common service entity; and the resource access control policies of the first entity and the second entity are set only when the trusted levels meet a preset level. Optionally, which security level of access policy (e.g., full access, or temporary access) is to be set may also be determined according to the trusted levels of the first entity and the second entity.

More specifically, the setting the resource access control policies of the first entity and the second entity may include: updating (modifying) the existing resource access control policies of the first entity and the second entity (corresponding to full access), that is, the first entity and the second entity are given full access to each other's resource (e.g., the two parties are in a fully trusted relationship); or may further include: additionally creating a new resource access control policy (corresponding to temporary access), that is, at least one of the first entity and the second entity may only be allowed to temporarily access the other's resource. For example, application A and application B both have high trusted levels, so application A and application B may access each other's resource at any time; or application A has a low trusted level, while application B has a high trusted level, so when application A sends out an access request (data acquisition request), the common service entity will create for the resource access control policy of application B to allow application A to temporarily access the resource of application B, but update the resource access control policy of application A to allow application B to access the resource of application A at any time.

Therefore, the setting the resource access control policies of the first entity and the second entity may include several situations below: 1. updating the resource access control policy of the first entity, and updating the resource access control policy of the second entity; 2. creating a temporary access control policy of the first entity, and creating a temporary access control policy of the second entity; 3. updating the resource access control policy of the first entity, and creating a resource temporary access control policy of the second entity; or, 4. updating the resource access control policy of the second entity, and creating a temporary access control policy of the first entity.

For example, the updating the resource access control policy of the first entity may include: making the accessing party identity(ies) in the resource access control policy include the identities of the first entity and the second entity, the accessing party identity indicating the entity(ies) that is allowed to access the resource of the first entity. For example, with respect to application entity AE1, the preset identity(ies) included in the resource access control policy for the resource of the application entity AE1 may be updated from including the identity of application entity AE1 only to including the identity of application entity AE1 and the identity of application entity AE2, thereby allowing application entity AE1 and application entity AE2 to access the resource of application entity AE1.

Similarly, the updating the resource access control policy of the second entity may include: making the accessing party identity(ies) in the resource access control policy include the identities of the first entity and the second entity, the accessing party identity indicating the entity(ies) that is allowed to access the resource of the second entity. For example, with respect to application entity AE2, the preset identity(ies) included in the resource access control policy for the resource of the application entity AE2 may be updated from including the identity of application entity AE2 only to including the identity of application entity AE1 and the identity of application entity AE2, thereby allowing application entity AE1 and application entity AE2 to access the resource of application entity AE2.

Therefore, after updating the resource access control policies of the first entity and the second entity, both the first entity and the second entity have authority to access each other's resource, so that data sharing may be implemented.

On the other hand, the contents below are further description of the temporary access already mentioned above. For example, the first entity may not expect to share or may be incapable of sharing data with any other entity in some time periods (e.g., data uploaded by the device associated with the first entity in these time periods is highly confidential data), while may allow access by the other entity or share data with the other entity in other time periods (e.g., confidential data has been acquired and no longer exists in the resource). Or, as described above, if a trusted level of an entity requesting access to the resource of the first entity is not high, a time period allowed for the entity to access the resource of the first entity may be limited, for example, the entity is allowed to access the resource of the first entity only in a specific time period. Therefore, the embodiments of the present disclosure further propose the concept of the temporary access, that is, access to some resources may be allowed only within some time periods, or access to some resources may be allowed only for some entities within a specific time period, to enhance security of data of the resource. This may be implemented by creating a temporary access control policy for the resource by the common service entity.

The temporary (resource) access control policy may be similar to the existing resource access control policy, except that specific contents included thereby will be different due to different access types. After the temporary access control policy of the second entity, for example, is created on the common service entity, the common service entity may judge respective access rules in the temporary access control policy.

For example, creating the temporary access control policy of the first entity includes: creating a temporary accessing party identity, and including the identity of the second entity therein, the temporary accessing party identity indicating an entity that is allowed to temporarily access the first entity. For example, with respect to application entity AE1, the temporary accessing party identity in the temporary access control policy created for the resource of the application entity AE1 may include the identity of application entity AE2, thereby allowing application entity AE2 to temporarily access the resource of application entity AE1.

Similarly, creating the temporary access control policy of the second entity includes: creating a temporary accessing party identity, and including the identity of the first entity therein, the temporary accessing party identity indicating an entity that is allowed to temporarily access the second entity. For example, with respect to application entity AE2, the temporary accessing party identity in the temporary access control policy created for the resource of the application entity AE2 may include the identity of application entity AE1, thereby allowing application entity AE1 to temporarily access the resource of application entity AE2.

Therefore, by creating the respective temporary access control policies respectively for the first entity and the second entity, both parties have authority of temporary access to each other's resource, so that data sharing may be implemented.

Of course, as described above, the resource access control policy may be updated for one of the first entity and the second entity, and a temporary access control policy may be created for the other one of the first entity and the second entity. Through such setting, the first entity and the second entity may access each other, but one of them only have a temporary access authority to the other one. For example, with respect to application entity AE2, the temporary accessing party identity in the temporary access control policy for the resource thereof may include the identity of application entity AE1, so that application entity AE1 may be allowed to temporarily access the resource of application entity AE2; meanwhile, with respect to application entity AE1, the preset identity included in the resource access control policy for the resource thereof may be updated to include the identity of application entity AE2 in addition to the identity of application entity AE1 per se, which, thus, may allow application entity AE2 to fully access the resource of application entity AE1.

Optionally, in order to improve security, sometimes it may be necessary to limit the amount of data acquired during the access to the resource from an external entity, to prevent malicious data acquisition. Therefore, the embodiments of the present disclosure further propose a solution that it may further limit the amount of data acquired from the resource.

More specifically, the above-described updating the resource access control policies of the first entity or the second entity (for full access) further includes: adding a data amount limit, indicating an upper limit threshold of a total data amount allowed to be acquired from the resource of the first entity or the resource of the second entity; or the creating the resource access control policies of the first entity or the second entity (for temporary access) further includes: creating a data amount limit, indicating an upper limit threshold of a data amount allowed to be acquired from the resource of the first entity or the resource of the second entity through temporary access.

Optionally, after the first entity has started to share data with the second entity, the common service entity may perform statistics on the amount of data that the first entity acquires from the resource of the second entity (through full access or temporary access), to obtain a statistical data amount to be compared with the data amount limit (representing the upper limit threshold of the data amount) in the resource access control policy or the temporary access control policy of the second entity to determine whether the statistical data amount exceeds the upper limit threshold of the data amount. After the statistical data amount acquired by first entity from the resource of the second entity exceeds the upper limit threshold of the data amount, the access rule of the data amount limit is no longer met, so the common service entity prohibits the first entity from continuing to acquire data from the resource of the second entity. Similarly, when sharing data with the first entity, the second entity may also acquire data from the resource of the first entity, which also needs to meet the access rule of the data amount limit in the resource access control policy or the temporary access control policy of the first entity.

For example, the unit of data amount may be KB, MB, TB.

In addition, with respect to the case of temporary access, as described above, there is a need to limit the time period allowed for temporary access, to improve security of data under the resource. Therefore, creating the temporary access control policy of the first entity or the second entity further includes: creating a temporary access time limit, indicating time allowed for temporary access to the resource of the first entity or the second entity.

Optionally, temporary access to the resource may be set to be allowed after a certain time point, or temporary access to the resource may also be set to be allowed within a certain time period.

In step S230, a data acquisition response is sent to the first entity, wherein, the data acquisition response includes the target data.

For example, by setting the resource access control policies of the first entity and the second entity, the first entity and the second entity are capable of accessing each other, so the common service entity may return the required target data stored under the second entity to the first entity.

For example, after receiving the data acquisition response, the first entity may adaptively adjust its own data based on the acquired target data. Furthermore, based on the data acquisition response, the first entity may determine that it is capable of accessing the resource of the second entity. Thereafter, if the first entity expects to acquire the relevant data stored at the same resource of the second entity on the common service entity again, the first entity may send a data acquisition request to the common service entity, and the data acquisition request may no longer include the sharing operation indication information, but only include the identity of the same resource of the second entity (i.e., the identity of the target resource) The resource access control policy of the second entity has been set at the common service entity, and at this time, the received data acquisition request no longer includes the sharing operation indication information, the common service entity will judge whether the first entity meets the current resource access control policy of the second entity (e.g., whether the time when the first entity initiates the data acquisition request is within the time period allowed for temporary access in the resource temporary access control policy of the second entity) based on the set resource access control policy, and return the data acquisition response to the first entity after determining that the current resource access control policy is met.

Optionally, having set the resource access control policies of the first entity and the second entity, the common service entity may also send a notification to the second entity, to notify that the second entity may also acquire the data of the resource of the first entity.

In addition, according to some embodiments, when two entities may access resource and share data with each other, data types under the resource may be the same or different. During data sharing, upper limit thresholds of the data amount acquired by both parties from each other are expected to be equal, so as to facilitate resource management and implement the principle of reciprocity. Therefore, similarly, a data sharing rule may be added to the resource access control policy or the data sharing rule may be added to the created temporary access control policy, wherein, the data sharing rule limits that upper limit thresholds of data amounts respectively acquired by each of both parties from the other party for the data of the same type should be equal, that is, both parties each may acquire the same amount of data of the type from the other party at most. It should be noted that "equal" here may be understood as a relative meaning, that is, a certain error range is allowed.

However, there may be a case where resource types (data types) of two resources between which the data sharing is performed are different. In such a case, it is necessary to perform data amount conversion firstly, and apply the above-described data sharing rule to the converted data amount.

Therefore, as shown in FIG. 2B, the method 200 may further include step S210', that is, determining whether the data type of the resource of the first entity is the same as the data type of the resource of the second entity. For example, the determination step may be performed before setting the respective resource access control policies of the first entity and the second entity in step S220. In addition, a result of determining whether the data types are the same may also be used for setting these resource access control policies.

For example, in a case where it is determined that the data type of the resource of the first entity is the same as the data type of the resource of the second entity, the data sharing rule may be added to the access control policy or the data sharing rule may be added to the created temporary access control policy, to limit that upper limit thresholds of data amounts respectively acquired by the first entity and the second entity from each other for the data of the same type should be equal.

In a case where it is determined that the data type of the resource of the first entity is different from the data type of the resource of the second entity, the data sharing rule may be added to the resource access control policy, to limit that upper limit thresholds of converted data amounts respectively acquired by the first entity and the second entity from each other for data of different types should be equal, and a data amount conversion rule is added for converting the amount of data acquired from the resource. In this way, when performing the sharing operation, the converted data amount acquired by the first entity and/or the second entity from each other may each be compared with the upper limit threshold of the data amount, so as to prohibit the first entity or the second entity from continuing to acquire data from the resource of the other party after the converted data amount acquired by the first entity or the second entity from the resource of the other party exceeds the upper limit threshold of the data amount. In this way, even if the data types are different, the upper limit thresholds of the data amounts are still equal, so as to facilitate resource management.

Optionally, data under each resource has a content value attribute, and a value of the content value attribute is predefined and positively related to usefulness of the data under the resource. The data amount conversion rule includes: multiplying the data amount of data acquired from the resource by the value of the content value attribute of the data to obtain the converted data amount.

For example, the larger the value of the content value attribute, the higher the usefulness of the corresponding data. For example, with respect to a bicycle sharing application, temperature data and location data may be included under a resource corresponding to the application (as an application entity AE) A content value of the temperature data may be 1, while a content value of the location data may be 2, because with respect to a bicycle, location data may be more useful for a bicycle sharing enterprise, for example, through the location data, it may be known which road sections have more users, so that more bicycles may be put on these road sections, or for other enterprise that expects to share data with the bicycle sharing enterprise (the enterprise having bicycle sharing service and commercial recommendation service), acquiring the location data is more favorable for business recommendation of the enterprise. For example, if both parties (application A and application B) may access each other's resource, with respect to a same type of applications, a content value corresponding to data acquired by application A from the resource of application B is 1, while a content value corresponding to data acquired by application B from the resource of application A is 2; assuming that both parties have acquired 2 M of data, it may be actually considered that the converted data amount acquired by application A is 2 M, and the converted data amount acquired by application B is 4 M. When an upper limit is 4 M, application B will be prohibited from acquiring data from the resource of application A, while application A may continue to acquire data from the resource of application B.

Figure 3A:
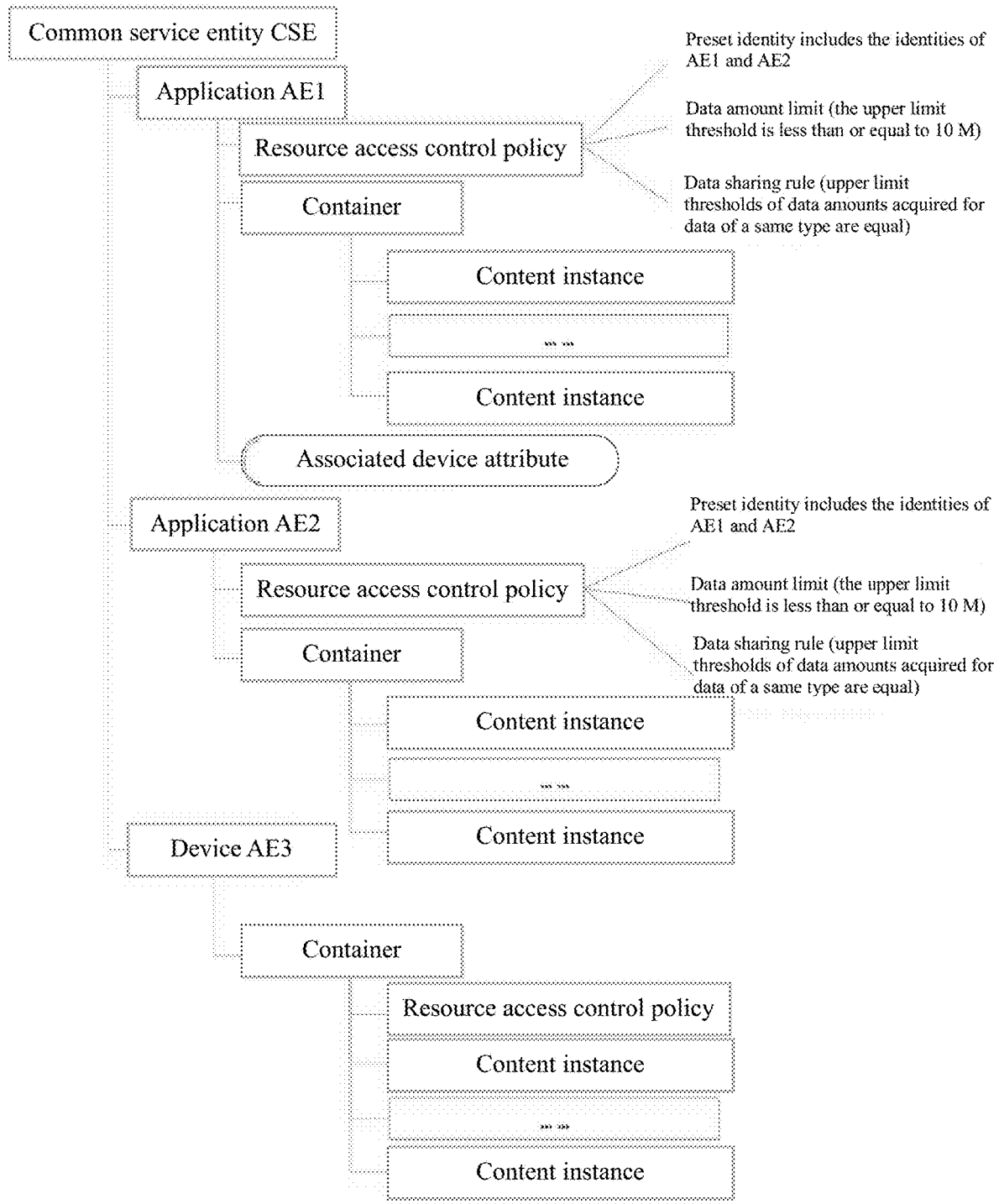
FIG. 3A to FIG. 3B shows a schematic diagram of a resource structure according to an embodiment of the present disclosure.
Figure 3B:
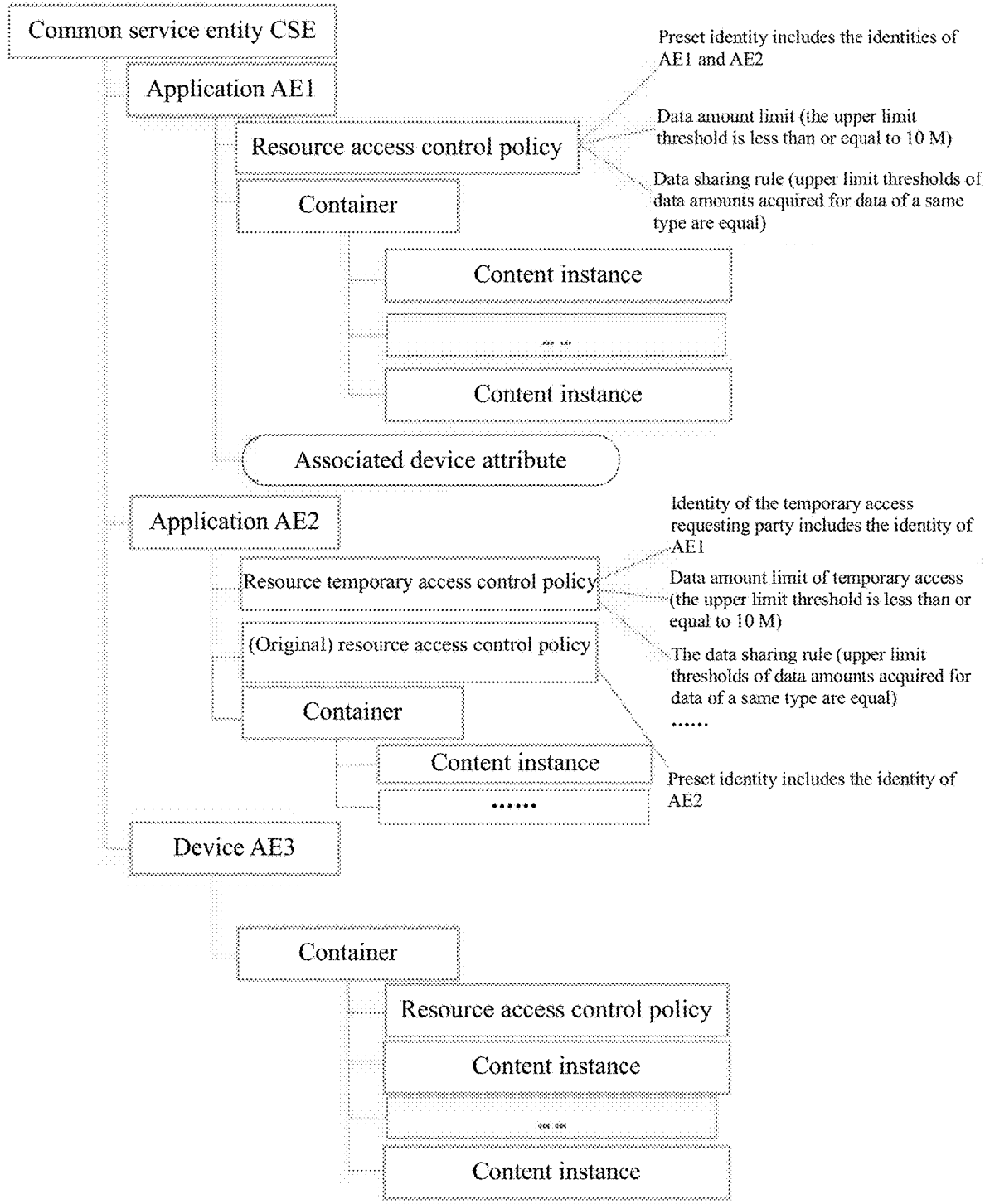

For ease of illustration, FIG. 3A to FIG. 3B shows a resource structure on the common service entity after updating the original resource access control policy or creating a temporary access control policy.

As shown in FIG. 3A, the resource of the first entity (taking an application entity as example, represented as AE1) and the resource of the second entity (AE2) are set under the common service entity CSE. A sub-resource is set under the resource of the first entity (AE1), wherein, the sub-resource includes the resource access control policy of the first entity and a container, and the container is a basic unit for resource allocation and scheduling, and may encapsulate and store the application data from the application.

An associated device attribute of a device associated with the application entity, for example, the identity of device A associated with application A, is also set under the resource of the first entity (AE1), to associate application A with device A. For example, when temperature data uploaded by device A to the common service entity is updated, a data value at a specific sub-resource where the temperature data is stored under the resource corresponding to device A (e.g., device AE3 in FIG. 3A) under the common service entity will change. Since the common service entity knows that device A is associated with application A, application A may also acquire the updated data of device A from the common service entity. The resource of the second entity (AE2) may have a structure similar to the resource of the first entity (AE1), or may also have a sub-resource of lower level set or have other resource of a same level added according to its own situation.

With respect to the resource access control policy under a resource of each entity (AE1, AE2 or AE3) for the resource, FIG. 3A shows a case where the resource may be fully accessed. For example, the resource access control policy of the first entity is updated to include the identity of the second entity in addition to the original identity of the first entity in the preset identity of the access requesting party, and the resource access control policy of the second entity is updated to include the identity of the first entity in addition to the original identity of the second entity in the preset identity of the access requesting party. Besides, it is also shown in FIG. 3A that the resource access control policy may further include the data amount limit and the data sharing rule. However, those skilled in the art should understand that although not shown in FIG. 3A, the resource access control policy may further include other possible access rules, for example, data amount conversion rules (considering a case where data types of the resources are different, etc.), access number limit (existing access rules), and so on.

In addition, with respect to a sub-resource under a resource, even if a resource access control policy has been created for the resource, a further sub-resource access control policy may also be set for the sub-resource.

FIG. 3B is similar to FIG. 3A, except that FIG. 3B shows the resource access control policy of the first entity (AE1) and the resource temporary access control policy of the second entity (AE2).

As shown in FIG. 3B, the temporary access control policy is newly created, and the original resource access control policy remains unchanged. In FIG. 3B, the temporary access control policy of the second entity (AE2) may include: access requesting party limit (the accessing party identity that allows temporary access to the second entity includes the identity of the first entity (AE1)); access time limit (the time period allowed for temporary access to the first entity is 8:00 to 18:00 every day); data amount limit (the maximum value of data amount allowed be acquired from the first entity through temporary access is 10 M); the data amount conversion rule; and the data sharing rule. However, those skilled in the art should understand that the temporary access control policy may further include other possible access rules.

Figure 4:
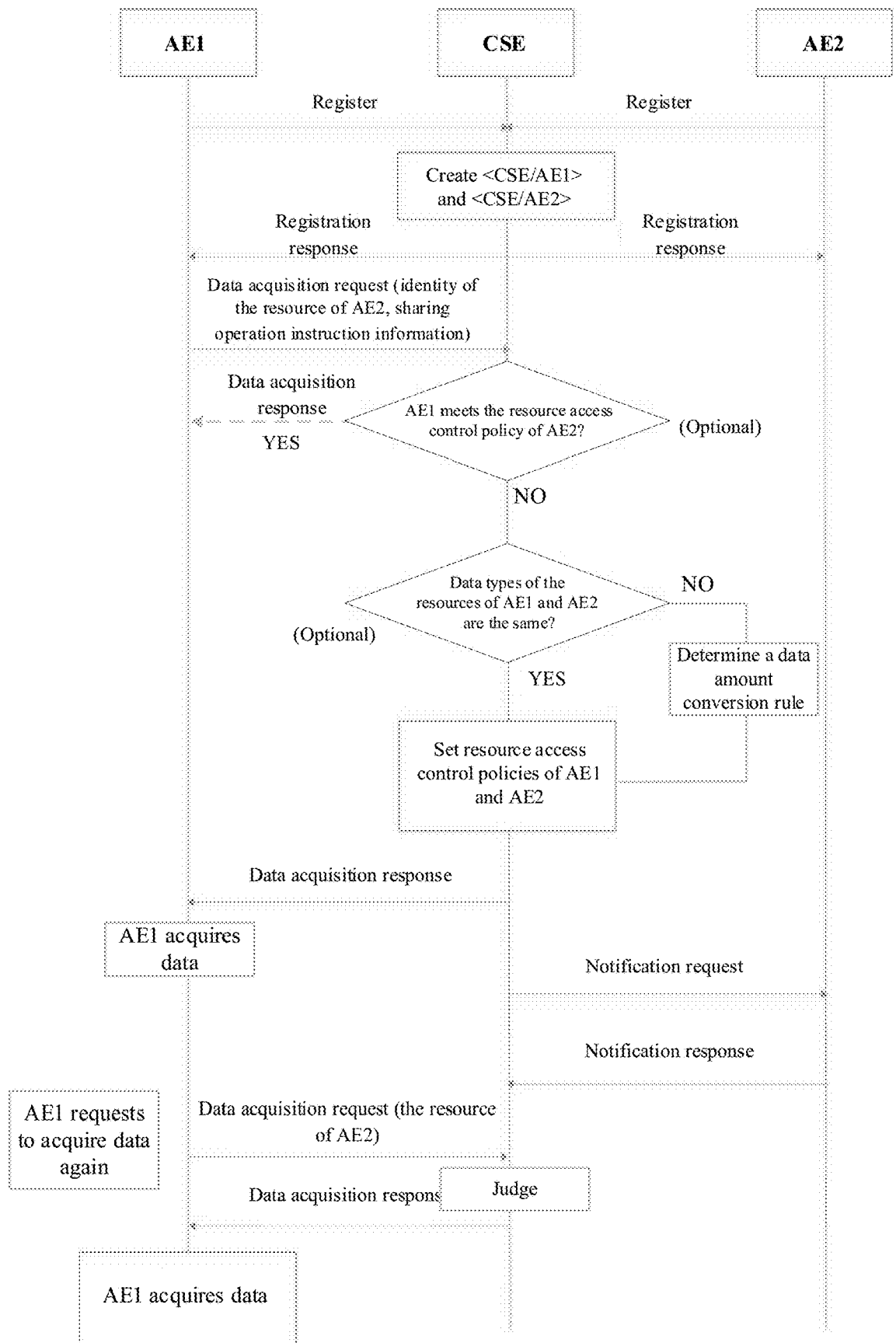
FIG. 4 shows a schematic flow chart of interaction based on the data sharing method according to an embodiment of the present disclosure.

Hereinafter, the process of data sharing between the first entity and the second entity is further described with reference to FIG. 4. FIG. 4 shows a schematic flow chart of data sharing between the first entity and the second entity according to the embodiment of the present disclosure.

Firstly, the first application entity (AE1) and the second application entity (AE2) are respectively registered to the common service entity (CSE), so that CSE may create resources for AE1 and AE2, for example, respectively represented as <CSE/AE1> and <CSE/AE2>. The resources may include a plurality of sub-resources and may store respective types of data of AE1 and AE2, for example, their respective application data and data uploaded by associated devices. After creating the above-described resources, CSE respectively returns registration responses to AE1 and AE2.

Then AE1 sends a data acquisition request to CSE (for a first time). The data acquisition request includes the identity of the resource of the application entity (AE2) storing the target data and the sharing operation indication information. The sharing operation indication information may include: the identity of the resource of AE1; or, the identity of the sharing operation; or, the identity of the sharing operation and the identity of the resource of AE1.

If AE1 determines that it is not the first time to share data with the resource of AE2, and the resource access control policy of AE2 is still valid (as described above), then the data acquisition request may not include the sharing operation indication information; and after receiving the data acquisition request, CSE determines that AE1 meets AE2's previous resource access control policy that is still valid currently, then CSE directly returns the target data to AE1. Of course, the pre-operation of AE1 and CSE is optional.

Based on the data acquisition request, CSE determines (is implicitly or explicitly indicated) that AE1 expects to share data with AE2 (i.e., expects to access the resource of AE2 on CSE, and allow its own resource to be accessed by AE2). In a case where the sharing operation indication information is the identity of the resource of AE1, CSE determines that the AE1 does not meet the resource access control policy of AE2 (e.g., by judging whether the identity of AE1 (the identity of AE1 may be determined according to the identity of the resource of AE1) is included in the preset identity of the access requesting party that is allowed to access the resource of AE2, and if there is no previous sharing process, in the current resource access control policy, AE1 is incapable of directly sending an access request for the resource of AE2, the judgment result is NO), so CSE sets the resource access control policies of AE1 and AE2 at CSE, so that AE1 and AE2 may access each other's resource. In addition, before the setting, CSE may optionally return a data acquisition failure response to AE1 to notify AE1 that AE1 currently is incapable of directly acquiring the target data, but needs CSE to reset the resource access control policy so as to make it feasible; or, when the sharing operation indication information at least includes the identity of the sharing operation, CSE may set the resource access control policies of AE1 and AE2 at CSE based on the identity of the sharing operation, without judging whether AE1 meets the resource access control policy of AE2, so that AE1 and AE2 may access each other's resource. In such a case, optionally, CSE may determine whether AE1 and/or AE2 initiating the data acquisition request are trusted parties before setting respective resource access control policies of AE1 and AE2, so as to improve security. Optionally, which security level of access policy (e.g., full access, temporary access) to set may also be determined according to the trusted levels of AE1 and AE2.

In addition, before setting the resource access control policies of AE1 and AE2, CSE may also firstly determine whether the data types of the resources of AE1 and AE2 are the same; if the data types are not the same, CSE should also determine to create or update the data amount conversion rule in the resource access control policies.

Thereafter, CSE may acquire the target data under the resource of AE2 registered thereto and return the data acquisition response to AE1, and the data acquisition response includes the target data. Optionally, AE1 may adaptively adjust its own data based on the acquired target data.

Next, CSE may also send a notification request to AE2 to notify AE2 that AE2 may access the resource of AE1 to share data with AE1. Exemplarily, the notification request may include the resource access control policy of AE1. AE2 may return a notification response to CSE after successfully receiving the notification request.

Furthermore, AE1 may determine that it is capable of accessing the resource of AE2 based on the data acquisition response. Thereafter, if AE1 again expects to acquire the relevant data stored at the resource of AE2 on CSE, AE1 may send a data acquisition request to CSE, and the data acquisition request may no longer include the sharing operation indication information, but only include the identity of the resource of AE2 (i.e., the identity of the target resource), therefore, since the resource access control policy of AE2 has been set at CSE, and at this time, the received data acquisition request no longer includes the sharing operation indication information, CSE will judge whether AE1 meets the resource access control policy of AE2 based on the set resource access control policy (e.g., whether the time when AE1 initiates the data acquisition request is within the time period allowed for temporary access in the resource temporary access control policy of AE2), and return the data acquisition response to AE1 after judging that the resource access control policy of AE2 is met.

In the data sharing method described with reference to FIG. 2A to FIG. 4, by updating the original resource access control policy of the resource, different entities are capable of accessing each other's resource to implement data sharing, and a temporary resource access control policy may also be created to further improve security of resource access. In addition, by including data amount limit, temporary access time, a data sharing rule and an optional data conversion rule in the updated or created resource access control policy, reliability and security of data sharing may be improved, and volumes (data amounts) of the resources acquired by two entities from each other may be made equal.

The above description with reference to FIG. 2A to FIG. 4 is for the scenario where different entities are registered to a same common service entity, so as to share data through mutual resource access between the different entities through the common service entity. Hereinafter, an example is given for a scenario where different entities are registered to different common service entities, so as to share data through mutual resource access between the different entities through interaction between the different communication service entities.

Figure 5:
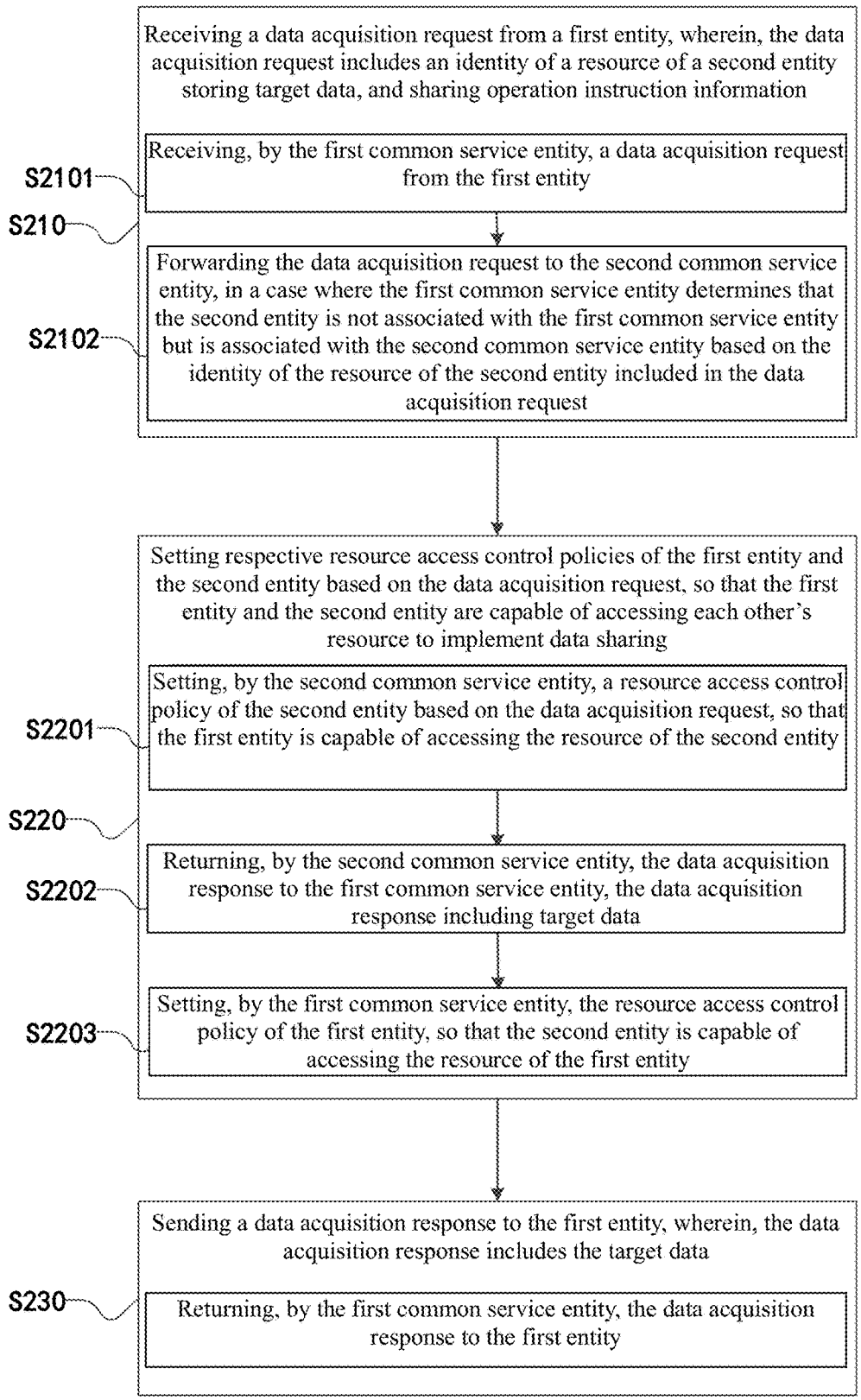
FIG. 5 shows more details of the method of FIG. 2A in a case where different entities are registered to different communication service entities according to the embodiment of the present disclosure.

FIG. 5 shows more details of the method 200 in a case where different entities are registered to different communication service entities.

In such a case, the first entity is associated with a first common service entity (e.g., registered to the first common service entity, where the first common service entity creates a resource and an original resource access control policy for the first entity); the second entity is associated with a second common service entity (e.g., registered to the second common service entity, where the second common service entity creates a resource and an original resource access control policy for the second entity); and the first common service entity and the second common service entity are registered with each other, so that the first common service entity and the second common service entity may acquire each other's data and forward messages.

Step S210 may specifically include respective sub-steps below.

In sub-step S2101, the first common service entity receives a data acquisition request from the first entity.

More content of the data acquisition request are the same as the content described above with reference to FIG. 2A to FIG. 4, so no details will be repeated here.

In step S2102, in a case where the first common service entity determines that the second entity is not associated with the first common service entity but is associated with the second common service entity based on the identity of the resource of the second entity included in the data acquisition request, the first common service entity forwards the data acquisition request to the second common service entity.

Since the first entity and the second entity are respectively registered to the first common service entity and the second common service entity, the first common service entity does not create any resource for the second entity, and thus is not capable of coordinating data sharing between the first entity and the second entity. Since the first common service entity and the second common service entity are registered with each other, the first common service entity knows that the second entity is registered to the second common service entity, and thus may forward the data acquisition request to the second common service entity. In addition, if the first common service entity determines that the second entity is not registered at the first common service entity and is not registered at the second common service entity, the first common service entity directly returns an acquisition failure response to the first entity.

Similarly, step S220 may include respective sub-steps below.

In step S2201, the second common service entity sets a resource access control policy of the second entity based on the data acquisition request, so that the first entity is capable of accessing the resource of the second entity.

For example, the setting the resource access control policy of the second entity may include updating the resource access control policy or creating a new temporary resource access control policy. Specific updating and creating modes are the same as the modes as described above in detail, and no details will be repeated here.

In step S2202, the second common service entity returns the data acquisition response to the first common service entity, and the data acquisition response includes target data.

The target data is stored under the resource of the second entity at the second common service entity, the second common service entity fetches the target data stored therein, but is incapable of directly communicating with the first entity, so the second common service entity includes the target data in the data acquisition response and returns the same to the first common service entity that forwards the data acquisition request to the second common service entity.

In step S2203, the first common service entity sets the resource access control policy of the first entity, so that the second entity is capable of accessing the resource of the first entity.

For example, the first common service entity may understand the above-described data acquisition response received from the second common service entity as that the second common service entity has allowed the first entity to access the requested resource of the second entity. Based on the understanding, the first common service entity may set the resource access control policy of the first entity, so that the second entity is also capable of accessing the resource of the first entity indicated by the identity of the resource of the first entity included in the previous data acquisition request.

In addition, in step S230, the first common service entity returns the data acquisition response to the first entity.

For example, the first common service entity finally returns the requested target data to the first entity, so that the first entity may adaptively adjust its own data according to the target data.

Figure 6:
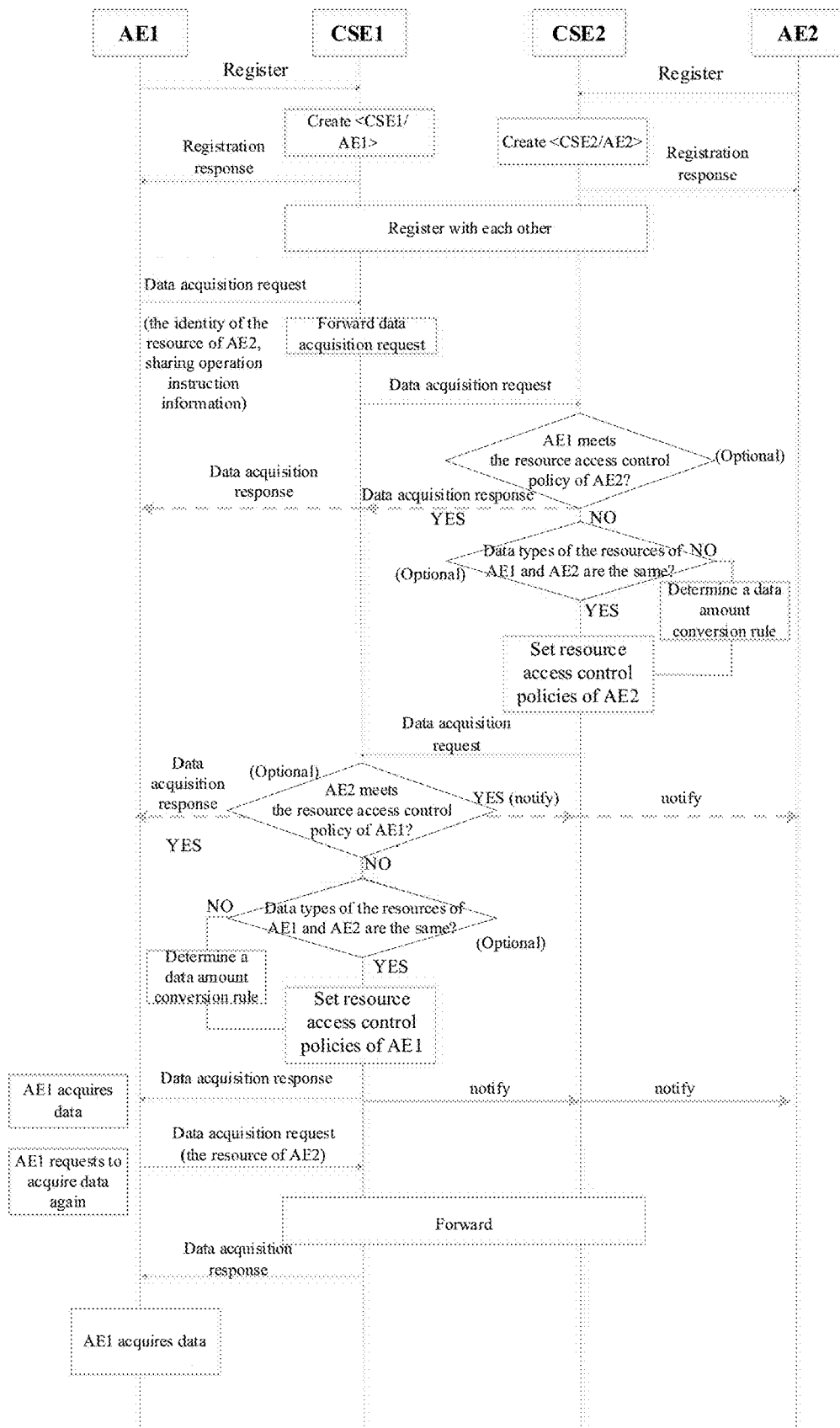
FIG. 6 shows a schematic flow chart of interaction based on the data sharing method shown in FIG. 5 according to the embodiment of the present disclosure.

In order to more clearly describe the present disclosure, the process of data sharing between the first entity and the second entity registered to different common service platforms will be further described below with reference to FIG. 6. FIG. 6 shows a schematic flow chart of data sharing between the first entity and the second entity registered to different common service platforms according to the embodiment of the present disclosure.

Firstly, the first application entity (AE1) and the second application entity (AE2) are respectively registered to a first common service entity (CSE1) and a second common service entity (CSE2), so that CSE1 and CSE2 may respectively create resources for AE1 and AE2, for example, respectively represented as <CSE1/AE1> and <CSE2/AE2>. The resources may include a plurality of sub-resources and may store respective types of data of AE1 and AE2, for example, respective application data and data uploaded by associated devices. After respectively creating the above-described resources, CSE1 and CSE2 return a registration response to AE1 and AE2.

Then AE1 sends a data acquisition request to CSE1 (for a first time). The data acquisition request includes the identity of the resource of the application entity (AE2) storing the target data and the sharing operation indication information. The sharing operation indication information may include: the identity of the resource of AE1; or, the identity of the sharing operation; or, the identity of the sharing operation and the identity of the resource of AE1.

Based on the data acquisition request, CSE1 determines (is implicitly or explicitly indicated) that AE1 expects to share data with AE2 (i.e., expects to access the resource of AE2 on CSE, and allow its own resource to be accessed by AE2), and meanwhile determines that AE2 is not registered to CSE1 but is registered to CSE2, so CSE1 forwards the data acquisition request to CSE2.

Similar to the description in FIG. 4 above, if AE1 determines that it is not the first time to share data with the resource of AE2, and the resource access control policy of AE2 is still valid, then the data acquisition request may not include the sharing operation indication information, and CSE2 determines that AE1 meets AE2's previous resource access control policy that is still valid currently after receiving the data acquisition request forwarded by CS1, and then directly returns the target data to AE1. Of course, the pre-operation of AE1, CSE1 and CSE2 is optional.

After CSE2 receives the data acquisition request (including the sharing operation indication information), in a case where the sharing operation indication information is the identity of the resource of AE1, CSE2 judges that the AE1 does not meet the resource access control policy of AE2, so CSE2 sets the resource access control policy of AE2 at CSE2, so that AE1 is capable of accessing the resource of AE2; or, in a case where the sharing operation indication information includes at least the identity of the sharing operation, CSE2 sets the resource access control policy of AE2 at CSE2 based on the identity of the sharing operation, without judging whether AE1 meets the resource access control policy of AE2. In such a case, CSE2 needs to determine whether AE1 initiating the data acquisition request is a trusted party before setting the resource access control policy of AE2, so as to improve security. Optionally, which security level of access policy (e.g., full access, temporary access) for AE1 to set may also be determined according to the trusted level of AE1.

Thereafter, CSE2 may acquire the target data under the resource of AE2 registered to CSE2 and return the data acquisition response to CSE1. In response to receiving the data acquisition response, CSE1 may determine that CSE2 has allowed AE1 to access the requested resource of AE2, so, CSE1 also sets the resource access control policy for AE1 (a specific setting process is the same as the previous text), so that AE2 is also capable of accessing the resource of AE1 on CSE1, thereby implementing data sharing. CSE1 may also send a notification request to CSE2 to notify AE2 via CSE2 that the resource of AE1 may be accessed to share data with AE1. Exemplarily, the notification request may include the resource access control policy of AE1. After receiving the notification request successfully, AE2 may return a notification response to CSE2, and the notification response is forwarded back to CSE1 by CSE2. Optionally, after receiving the data acquisition response from CSE2, similarly, CSE1 may also firstly determine whether AE2 meets the current resource access control policy of AE1, then directly return data to AE1 in a case where it is determined that AE2 meets the current resource access control policy of AE1, and send to AE2 via CSE (CSE1 and CSE2) a notification that the resource of AE1 may be accessed, without performing subsequent process; only in a case where it is determined that the current resource access control policy of AE1 is not met, the resource access control policy of AE1 may continue to be set at CSE1.

Next, CSE1 returns the data acquisition response to AE1, and the data acquisition response includes the target data. Optionally, AE1 may adaptively adjust its own data based on the acquired target data.

Furthermore, based on the data acquisition response, AE1 may determine that it is capable of accessing the previously requested resource of AE2. Thereafter, if AE1 expects to acquire the relevant data stored in the resource of AE2 on CSE2 again, AE1 may send a data acquisition request to CSE1, and the data acquisition request is forwarded to CSE2 via CSE1, wherein, the data acquisition request may no longer include the sharing operation indication information, but only include the identity of the resource of AE2 (i.e., the identity of the resource including target data), therefore, since the resource access control policy of AE2 has been set at CSE2, and at this time, the received data acquisition request no longer includes the sharing operation indication information, CSE2 will judge whether AE1 meets the resource access control policy of AE2 based on the set resource access control policy (e.g., whether the time when AE1 initiates the data acquisition request is within the time period allowed for temporary access in the resource temporary access control policy of AE2), and return the data acquisition response to AE1 via CSE1 after judging that the resource access control policy of AE2 is met.

In the data sharing method described with reference to FIG. 5 to FIG. 6, by updating the original resource access control policy of the resource or creating a new temporary resource access control policy, different entities registered to different common service entities are also capable of accessing each other's resource to implement data sharing.

Figure 7:
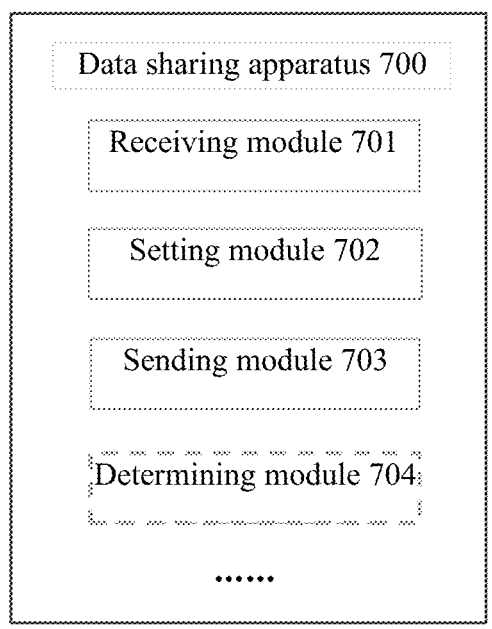
FIG. 7 shows a structural block diagram of a data sharing apparatus according to an embodiment of the present disclosure.

According to another aspect of the present disclosure, there is further provided a data sharing apparatus. FIG. 7 shows a structural block diagram of a data sharing apparatus 700 according to an embodiment of the present disclosure.

As shown in FIG. 7, the data sharing apparatus 700 includes a receiving module 701, a setting module 702, and a sending module 703.

The receiving module 701 is configured to receive a data acquisition request from a first entity, wherein, the data acquisition request includes an identity of a resource of a second entity storing target data, and sharing operation indication information.

The setting module 702 is configured to set resource access control policies of the first entity and the second entity based on the data acquisition request, so that the first entity and the second entity are capable of accessing each other's resource to implement data sharing.

The sending module 703 is configured to send a data acquisition response to the first entity, wherein, the data acquisition response includes the target data.

Optionally, the data sharing apparatus 700 may further include a determining module 704, which is configured to determine whether the resource of the first entity have a same data type as the resource of the second entity, and sends a determination result to the setting module, so that the setting module sets the resource access control policies of the first entity and the second entity according to the determination result.

More details of respective functions of the above-described respective modules have been described above in detail with reference to FIG. 2A to FIG. 4, and thus may be omitted here.

In addition, the data sharing apparatus may further include more or fewer modules according to a different division or the increase or decrease of functions, which will not be limited in the present disclosure.

In addition, according to another aspect of the present disclosure, there is further provided a data sharing system. The data sharing system includes: a first entity and a second entity; a common service entity; as well as a first device and a second device, wherein, the first entity and the second entity, as well as the first device and the second device are all registered to the common service entity, and the first entity and the second entity are associated with the first device and the second device, respectively.

As a specific example, the data sharing system may be a data sharing system used in a manufacture industry.

Figure 8:
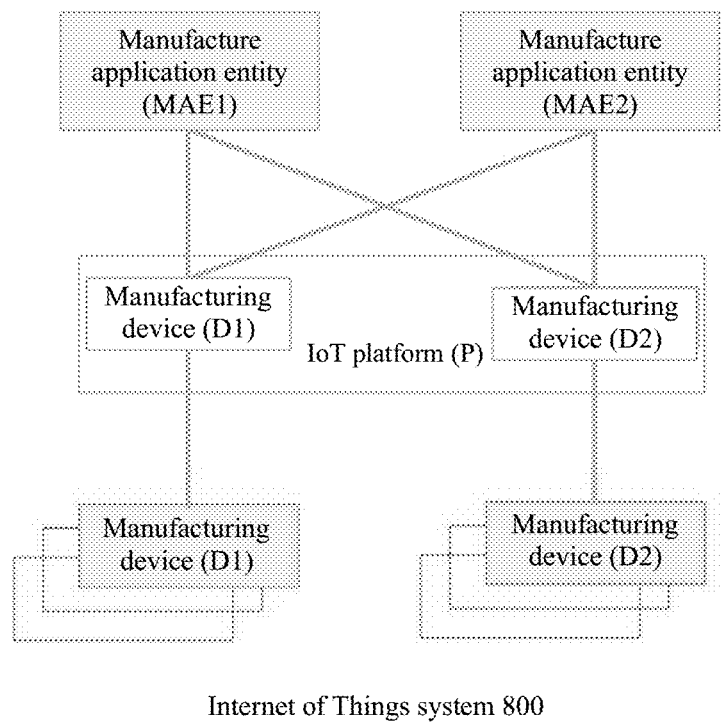
FIG. 8 shows a schematic diagram of a data sharing system according to an embodiment of the present disclosure.

FIG. 8 shows a schematic diagram of a data sharing system 800 according to an embodiment of the present disclosure.

As shown in FIG. 8, the data sharing system includes: a first manufacturing device (D1) and a second manufacturing device (D2); a first manufacture application (entity) (MAE1) and a second manufacture application (entity) (MAE2), wherein, the first manufacture application (MAE1) is associated with the first manufacturing device (D1), and the second manufacture application (MAE2) is associated with the second manufacturing device (D2); as well as an Internet of Things platform (P).

The Internet of Things platform (P) is configured to: store data uploaded by the first manufacturing device under a resource of the first manufacture application, the data, together with application data of the first manufacture application being taken as product data of the first manufacture application entity; store data uploaded by the second manufacturing device under a resource of the second manufacture application, the data, together with application data of the second manufacture application being taken as product data of the second manufacture application; receive a data acquisition request from the first manufacture application entity, the data acquisition request including an identity of the resource of the second manufacture application storing target product data and product data sharing operation indication information; set resource access control policies of the first manufacture application and the second manufacture application based on the data acquisition request, so that the first manufacture application and the second manufacture application are capable of accessing each other's resource to acquire each other's product data; and send a data acquisition response to the first manufacture application, the data acquisition response including the target product data.

The first manufacture application (MAE1) may send the above-described data acquisition request to the Internet of Things platform (P). In addition, before sending the above-described data acquisition request, the first manufacture application (MAE1) determines that the product data of the second manufacture application (MAE2) cannot be acquired by other means. For example, if the first manufacture application and the second manufacture application have previously shared data, and the corresponding resource access control policies are still valid, the sharing operation indication information may not be included in the data acquisition request. On the contrary, if the first manufacture application and the second manufacture application have not shared data with each other, or the previous resource access control policies have been invalid, the sharing operation indication information needs to be included in the data acquisition request.

The first manufacture application may adjust the product data of the first manufacture application according to the product data of the first manufacture application and the target product data acquired from the resource of the second manufacture application, so that the product data of the first manufacture application is compatible with the product data of the second manufacture application. For example, a wallpaper manufacturer's application adapts to a style of a sofa manufacturer according to the product data acquired from the sofa manufacturer's application.

Although it is described above by taking the data sharing system in the manufacture industry as an example, specific details and methods of setting the resource access control policies are still the same as the contents described above with reference to FIG. 2A to FIG. 4, and thus may also be omitted here.

According to still another aspect of the present disclosure, a server is further provided.

Figure 9:
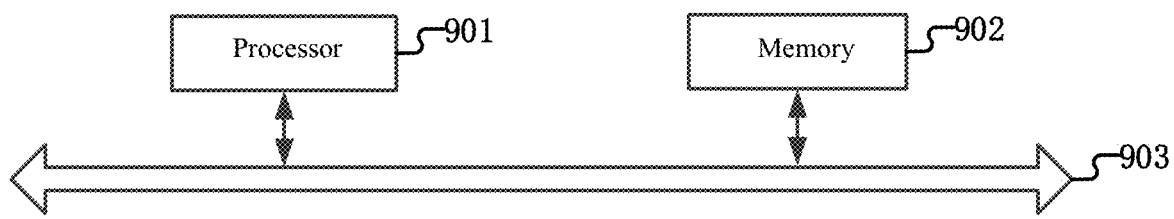
FIG. 9 shows a structural schematic diagram of a server according to an embodiment of the present disclosure.

FIG. 9 shows a server 900 according to an embodiment of the present disclosure. The server 900 may include a processor 901 and a memory 902. The processor 901 and the memory 902 may be connected via a bus 903.

The processor 901 may execute various actions and processes according to programs stored in the memory 902. When executed, the program in the memory may cause the processor to execute the respective steps of the data sharing method according to the embodiment of the present disclosure.

Specifically, the processor 901 may be an integrated circuit chip having a signal processing capability. The above-described processor may be a general-purpose processor, a Digital Signal Processor (DSP), an Application Specific Integrated Circuit (ASIC), a Field Programmable Gate Array (FPGA) or other programmable logic device, discrete gate or transistor logic device, and discrete hardware component. The general-purpose processor may be a microprocessor, or the processor any also be any conventional processor, etc., which may be of X99 architecture or ARM architecture.

The memory 902 may be a volatile memory or a non-volatile memory, or may include both the volatile memory and the non-volatile memory. The non-volatile memory may be a Read Only Memory (ROM), a Programmable Read Only Memory (PROM), an Erasable Programmable Read Only Memory (EPROM), an Electrically Erasable Programmable Read Only Memory (EEPROM) or a flash memory. The volatile memory may be a Random Access Memory (RAM), which is used as an external cache. By way of illustration but not limitation, many forms of RAM are available, for example, a Static Random Access Memory (SRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Synchronous Link Dynamic Random Access Memory (SLDRAM), and a Direct Rambus Random Access Memory (DRRAM). It should be noted that the memories in the method as described in the present disclosure are intended to include, but are not limited to, these and any other suitable types of memories.

According to still another aspect of the present disclosure, a computer storage medium is further disclosed, which has a computer program stored thereon, wherein, the computer program, when executed by a processor, is used to implement the data sharing method according to an embodiment of the present disclosure.

Although the present disclosure has been described in detail for various specific exemplary embodiments of the present disclosure, each example is provided by interpretation rather than limitation of the present disclosure. Those skilled in the art may easily make changes, variations and equivalents of such embodiments after understanding of the above-described contents. Therefore, the present disclosure does not exclude inclusion of such modifications, variations and/or additions to the present disclosure that will be apparent to those skilled in the art. For example, features illustrated or described as part of one embodiment may be used with another embodiment to generate still another embodiment. Therefore, it is intended that the present disclosure covers such changes, variations, and equivalents.

Specifically, although the drawings of the present disclosure respectively describe steps executed in a specific order for illustration and discussion purposes, the methods according to the present disclosure are not limited to the order or arrangement of the specific illustrations. Without departing from the scope of the present disclosure, the respective steps of the above-described method may be omitted, rearranged, combined and/or adjusted in various ways.

Those skilled in the art may understand that various aspects of the present disclosure may be illustrated and described through a number of patentable categories or situations, including any new and useful combination of processes, machines, products or substances, or any new and useful improvements to them. Accordingly, aspects of the present disclosure may be completely executed by hardware, software (including firmware, resident software, microcode, etc.), or a combination of hardware and software. The above hardware or software may all be referred to as "data block", "module", "engine", "unit", "component" or "system". Further, various aspects of the present disclosure may be represented as a computer product located in one or more computer readable media, and the product includes computer readable program codes.

The above are illustrations of the present disclosure, and should not be considered as limitations thereof. Although several exemplary embodiments of the present disclosure are described, those skilled in the art will readily understand that, a number of modifications may be made to the exemplary embodiments without departing from novel teaching and advantages of the present disclosure. Therefore, all these modifications are intended to be included in the scope of the present disclosure as defined in the claims. It should be understood that, the above are illustrations of the present disclosure, and should not be considered as limited to the specific embodiments disclosed, and the modifications to the disclosed embodiments and other embodiments are intended to be included in the scope of the appended claims. The present disclosure is defined by the claims and equivalents thereof.

The invention claimed is:

1. A data sharing method, comprising:
   receiving a data acquisition request from a first entity, wherein, the data acquisition request includes an identity of a resource of a second entity storing target data, and sharing operation indication information;
   setting resource access control policies of the first entity and the second entity based on the data acquisition request, so that the first entity and the second entity are capable of accessing each other's resource to implement data sharing; and
   sending a data acquisition response to the first entity, wherein, the data acquisition response includes the target data,
   wherein the data sharing method further comprises:
   determining whether the resource of the first entity has a same data type as the resource of the second entity; and
   in response to determination that the resource of the first entity has a different data type from the resource of the second entity, setting the resource access control policies of the first entity and the second entity further comprises:
   adding a data sharing rule, to limit that upper limit thresholds of data amounts for data of different data types respectively acquired by the first entity and the second entity from each other should be equal; and
   adding a data amount conversion rule, for converting the data amounts acquired from the resource.

2. The data sharing method according to claim 1, wherein, the sharing operation indication information comprises: an identity of a resource of the first entity,
   wherein, setting resource access control policies of the first entity and the second entity based on the data acquisition request, comprises:
   determining that the first entity expects to share data with the second entity, based on the identity of the resource of the first entity and/or an identity of a sharing operation and the identity of the resource of the second entity; and
   determining whether the first entity meets the resource access control policy of the second entity, and setting resource access control policies of the first entity and the second entity based on the determination.

3. The data sharing method according to claim 2, wherein, the setting the respective resource access control policies of the first entity and the second entity, comprises:
   updating the resource access control policy of the first entity, and updating the resource access control policy of the second entity; or
   creating a temporary access control policy of the first entity, and creating a temporary access control policy of the second entity; or
   updating the resource access control policy of the first entity, and creating a resource temporary access control policy of the second entity; or
   updating the resource access control policy of the second entity, and creating a temporary access control policy of the first entity.

4. The data sharing method according to claim 3, wherein,
   updating the resource access control policy of the first entity comprises: causing an accessing party identity in the resource access control policy of the first entity to include the identities of the first entity and the second entity, the accessing party identity indicating an identity of an entity that is allowed to access the resource of the first entity; and
   updating the resource access control policy of the second entity comprises: causing an accessing party identity in the resource access control policy of the second entity to include the identities of the first entity and the second entity, the accessing party identity indicating an identity of an entity that is allowed to access the resource of the second entity.

5. The data sharing method according to claim 3, wherein,
   creating the temporary access control policy of the first entity comprises: creating a temporary accessing party identity, and including the identity of the second entity therein, the temporary accessing party identity indicating an identity of an entity that is allowed to temporarily access the resource of the first entity;
   creating the temporary access control policy of the second entity comprises: creating a temporary accessing party identity, and including the identity of the first entity therein, the temporary accessing party identity indicating an identity of an entity that is allowed to temporarily access the resource of the second entity.

6. The data sharing method according to claim 3, wherein,
   updating the resource access control policy of the first entity or the second entity further comprises: adding a data amount limit, indicating an upper limit threshold of a data amount allowed to be acquired from the resource of the first entity or the resource of the second entity; or
   creating the temporary access control policy of the first entity or the second entity further comprises: creating a data amount limit, indicating an upper limit threshold of a data amount allowed to be acquired from the resource of the first entity or the resource of the second entity through temporary access;
   when the data amount acquired through temporary access from the resource of the first entity or the resource of the second entity reaches the upper limit threshold of the data amount, it is prohibited to continue to acquire data from the resource of the first entity or the resource of the second entity.

7. The data sharing method according to claim 3, wherein, creating the temporary access control policy of the first entity or the second entity further comprises:
   creating a temporary access time limit, indicating time allowed for temporary access to the resource of the first entity or the resource of the second entity.

8. The data sharing method according to claim 1, wherein, the sharing operation indication information comprises: an identity of a sharing operation; or the identity of the sharing operation and the identity of the resource of the first entity, wherein, setting resource access control policies of the first entity and the second entity based on the data acquisition request, comprises:
 determining that the first entity expects to share data with the second entity at least based on the identity of the sharing operation, and setting the resource access control policies of the first entity and the second entity.

9. The data sharing method according to claim 8, wherein the setting the respective resource access control policies of the first entity and the second entity comprises:
 updating the resource access control policy of the first entity, and updating the resource access control policy of the second entity; or
 creating a temporary access control policy of the first entity, and creating a temporary access control policy of the second entity; or
 updating the resource access control policy of the first entity, and creating a temporary access control policy of the second entity; or
 updating the resource access control policy of the second entity, and creating a temporary access control policy of the first entity.

10. The data sharing method according to claim 1,
 in response to determination that the resource of the first entity has a same data type as the resource of the second entity, setting the resource access control policies of the first entity and the second entity further comprises:
 adding a data sharing rule, to limit that upper limit thresholds of data amounts for data of the same data type respectively acquired by the first entity and the second entity from each other should be equal.

11. The data sharing method according to claim 1, wherein, data under a resource of each entity has a content value attribute, and a value of the content value attribute is predefined and positively related to usefulness of the data under the resource of the entity relative to the entity;
 the data amount conversion rule comprises: multiplying a data amount of data acquired from a resource by a value of the content value attribute of the data to obtain a converted data amount, and
 prohibiting to continue to acquire data from the resource, in a case where the converted data amount exceeds an upper limit threshold of the data amount.

12. The data sharing method according to claim 1, wherein, the first entity is associated with a first common service entity; the second entity is associated with a second common service entity, and the first common service entity and the second common service entity are registered to each other,
 wherein, receiving the data acquisition request from the first entity, comprises:
 receiving, by the first common service entity, the data acquisition request from the first entity; and
 forwarding the data acquisition request to the second common service entity, in a case where the first common service entity determines that the second entity is not associated with the first common service entity but is associated with the second common service entity based on the identity of the resource of the second entity included in the data acquisition request.

13. The data sharing method according to claim 12, wherein, setting resource access control policies of the first entity and the second entity based on the data acquisition request, comprises:
 setting, by the second common service entity, the resource access control policy of the second entity based on the data acquisition request, so that the first entity is capable of accessing the resource of the second entity;
 returning, by the second common service entity, a data acquisition response to the first common service entity, the data acquisition response including data of the target resource;
 setting, by the first common service entity, the resource access control policy of the first entity based on the data acquisition response, so that the second entity is capable of accessing the resource of the first entity; and
 returning, by the first common service entity, the data acquisition response to the first entity.

14. A server, comprising:
 a processor; and
 a memory, having a program stored thereon, wherein, the program, when executed by the processor, causes the processor to execute the respective steps of the data sharing method according to claim 1.

15. A non-transitory computer storage medium, having a program stored thereon, wherein, the computer program, when executed by the processor, implements the data sharing method according to claim 1.

16. A data sharing apparatus, comprising:
 a receiving module, configured to receive a data acquisition request from a first entity, wherein, the data acquisition request includes an identity of a resource of a second entity storing target data, and sharing operation indication information;
 a setting module, configured to set respective resource access control policies of the first entity and the second entity based on the data acquisition request, so that the first entity and the second entity are capable of accessing each other's resource to implement data sharing; and
 a sending module, configured to send a data acquisition response to the first entity, wherein, the data acquisition response includes the target data,
 wherein the data sharing apparatus further comprises:
 a determining module, configured to determine whether the resource of the first entity has a same data type as the resource of the second entity; and
 wherein, in response to determination that the resource of the first entity has a different data type from the resource of the second entity, the setting module is configured to set the resource access control policies of the first entity and the second entity by:
 adding a data sharing rule, to limit that upper limit thresholds of data amounts for data of different data types respectively acquired by the first entity and the second entity from each other should be equal; and
 adding a data amount conversion rule, for converting the data amounts acquired from the resource.

17. A data sharing system, comprising:
 a first manufacturing device and a second manufacturing device;
 a first manufacture application entity and a second manufacture application entity, wherein, the first manufacture application entity is associated with the first manufacturing device, and the second manufacture application entity is associated with the second manufacturing device; and
 an Internet of Things platform, configured to:
 store data uploaded by the first manufacturing device under a resource of the first manufacture application entity, the data, together with application data of the first manufacture application entity being taken as product data of the first manufacture application entity;

store data uploaded by the second manufacturing device under a resource of the second manufacture application entity, the data, together with application data of the second manufacture application entity being taken as product data of the second manufacture application entity;

receive a data acquisition request sent by the first manufacture application entity, the data acquisition request including an identity of the resource of the second manufacture application entity storing target product data and product data sharing operation indication information;

set resource access control policies of the first manufacture application entity and the second manufacture application entity based on the data acquisition request, so that the first manufacture application entity and the second manufacture application entity are capable of accessing each other's resource to acquire each other's product data; and send a data acquisition response to the first manufacture application entity, the data acquisition response including the target product data, wherein the Internet of Things platform is configured to:

determine whether the resource of the first manufacture application entity has a same data type as the resource of the second manufacture application entity; and in response to determination that the resource of the first manufacture application entity has a different data type from the resource of the second manufacture application entity, set the resource access control policies of the first manufacture application entity and the second manufacture application entity by:

adding a data sharing rule, to limit that upper limit thresholds of data amounts for data of different data types respectively acquired by the first manufacture application entity and the second manufacture application entity from each other should be equal; and adding a data amount conversion rule, for converting the data amounts acquired from the resource.

18. The data sharing system according to claim 17, wherein, the first manufacture application entity is configured to:

adjust the product data of the first manufacture application entity according to the product data of the first manufacture application entity and the target product data acquired from the resource of the second manufacture application entity, so that the product data of the first manufacture application entity is compatible with the product data of the second manufacture application entity.

* * * * *